Patented May 27, 1930

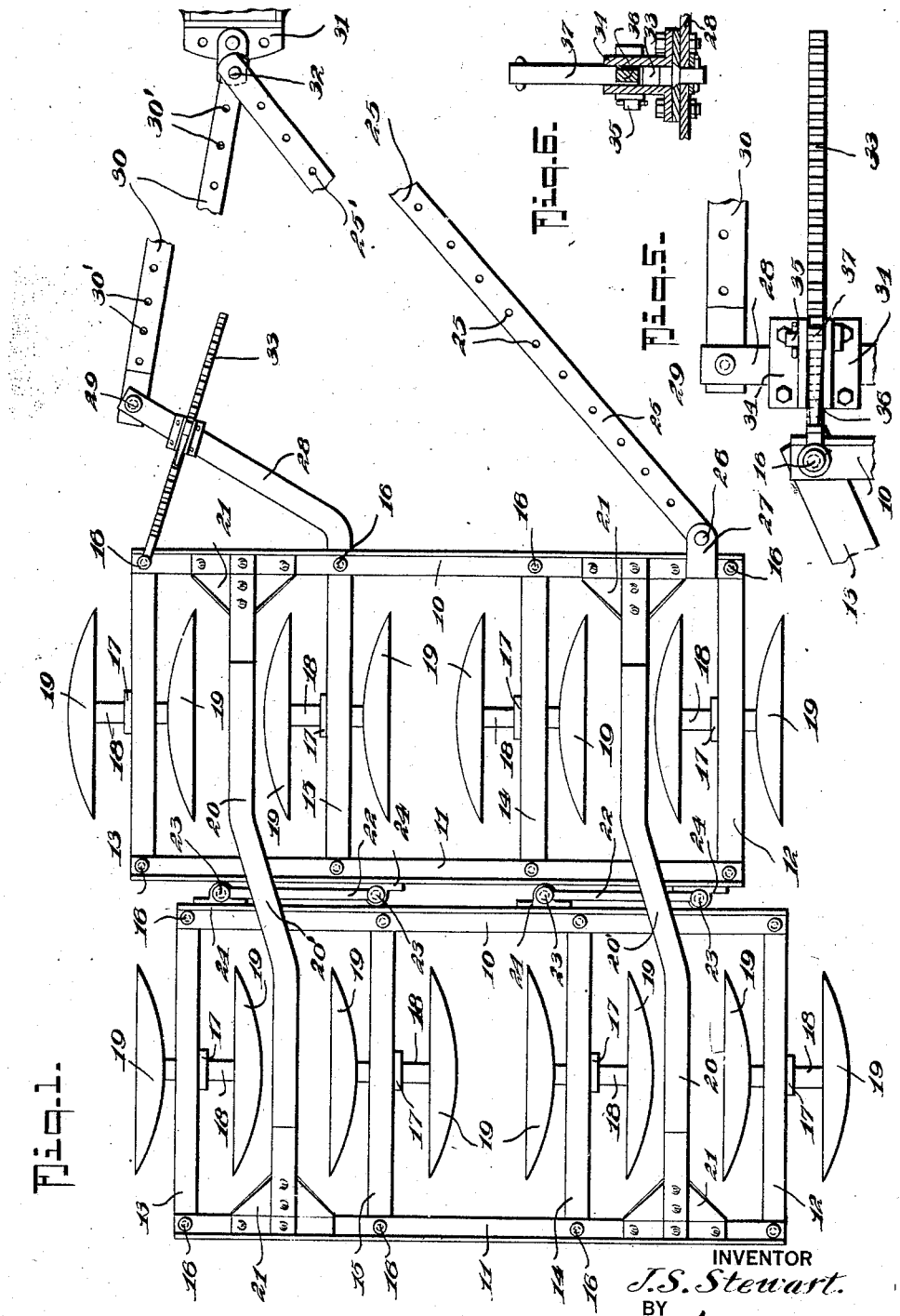

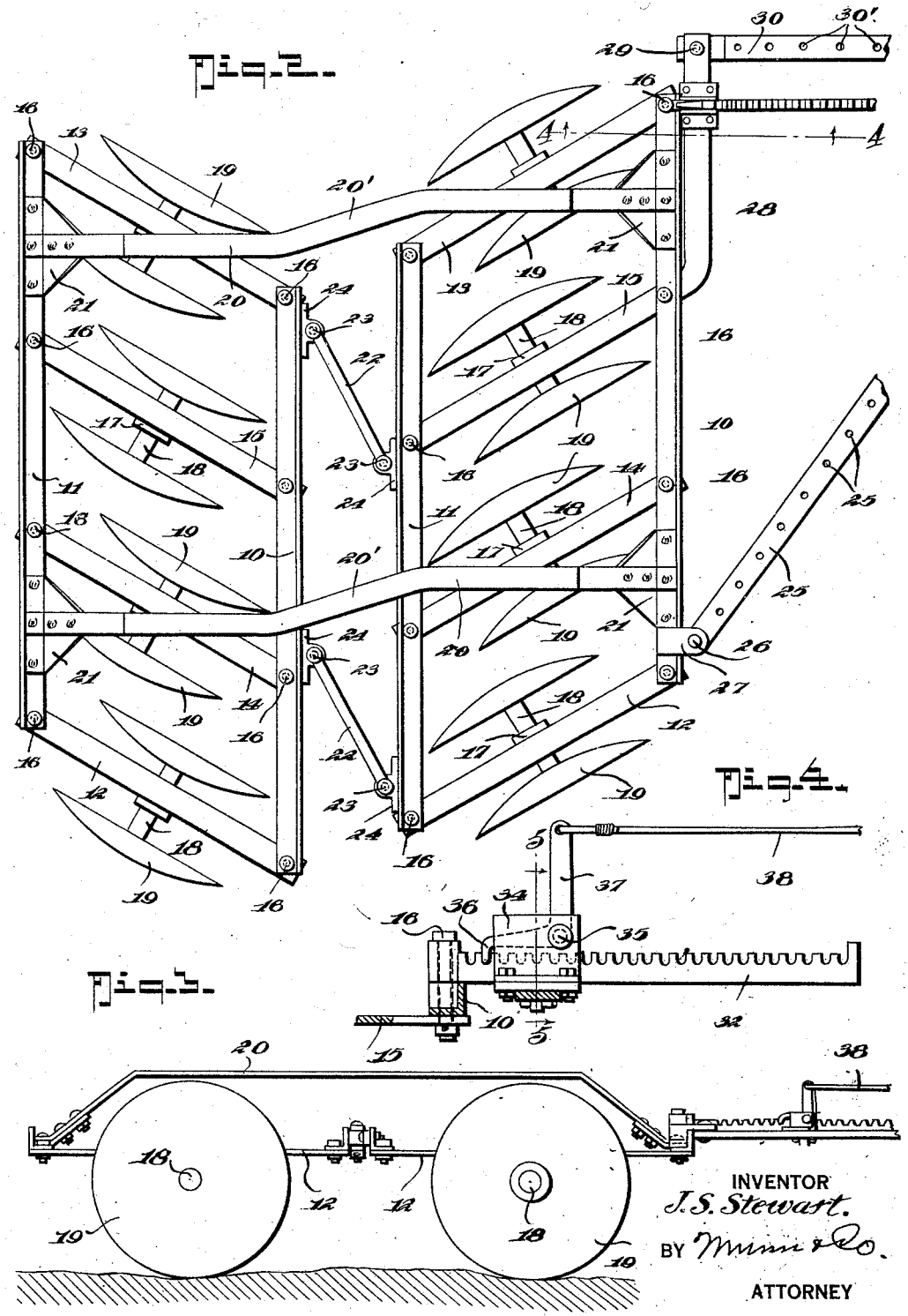

1,760,569

UNITED STATES PATENT OFFICE

JAMES S. STEWART, OF REDLANDS, CALIFORNIA, ASSIGNOR, BY MESNE ASSIGNMENTS, TO GEORGE VOSS, OF SAN BERNARDINO, CALIFORNIA

AGRICULTURAL MACHINE

Application filed August 25, 1927. Serial No. 215,425.

This invention relates to improvements in agricultural machines generally, and more particularly to a disc gang harrow type of such machines.

The principal object of the invention is to provide for a machine of the class set forth, and one of a mechanically refined construction and arrangement of parts, whereby the several disc blades of each gang are to be set to a desired angular working position by an angular adjustment of the gang frames, which adjustment of the gang frames also effects the offsetting of the discs of one frame to one side of the paths of travel of the discs of the other of the gangs, so that the soil broken up by the leading gang of disc blades will be further broken and loosened up by the action of the rear or trailing gang of disc blades.

Another object of the invention is the provision of a simple and effective means for accomplishing the desired adjustment of the gang frames, one with respect to the other, and one which is capable of a comparatively wide range of adjustment for the disposition of the disc blades at various angles, and correspondingly for soils of different workable characteristics.

A further object of the invention is to provide for a harrow construction as hereinbefore characterized, and embodying a draft coupling of a nature to permit of the making of shorter turns with the harrow than is possible in known disc harrow structures, and, at the same time, allows for the continued cutting and turning of the soil by the discs throughout the turning movements of the harrow.

With the foregoing and other equally important objects and advantages in view, the invention resides in the certain new and useful combinations, constructions and arrangements of parts as will be hereinafter more fully described, set forth in the appended claims, and illustrated in the accompanying drawings, in which:

Figure 1 is a top plan view of a preferred embodiment of the invention, as it appears when in position for ordinary travel from one point of use to another, Figure 2 is a similar view thereof, and showing the disposition of the gang frames and the disc blades when in soil cultivation position of operation, Figure 3 is a side elevation of the same with the gang frames positioned as in Figure 1, Figure 4 is an enlarged sectional detail of the means for adjusting the angular relation of the draft frame with respect to the leading gang frame, Figure 5 is an enlarged top plan view of the parts as shown in Figure 4, and Figure 6 is a vertical transverse section taken on the line 6—6 of Figure 4.

Referring to the drawings, wherein similar characters of reference designate corresponding parts throughout the several views thereof, the invention comprises a leading gang frame, of substantially rectangular form, consisting of the front and rear parallel frame members or bars 10 and 11, the oppositely disposed end or side frame members or bars 12 and 13 and the equidistantly spaced intermediate cross members or bars 14 and 15, the latter extending parallel to the end or side members or bars 12 and 13. The opposite ends of the several end and intermediate frame members or cross-bars 12, 13, 14 and 15 pivotally secured to the front and rear frame members or bars 10 and 11 in any suitable manner, as by means of the pivot bolts or the like 16.

Journalled in suitable bearings 17, intermediate of the opposite ends of each of the end and intermediate frame members 12, 13, 14 and 15 at the lower sides thereof are stud axles or spindles 18, on the oppositely projected ends of which are secured disc harrow blades 19.

When assembled for use, two of the harrow gangs as thus constructed and arranged are to be placed one in front of the other and in reversed relation, whereby the convexed sides of the several discs 19 of the leading gang will face toward the right hand side of the harrow, and those of the trailing gang to the left hand side of the same or vice versa. When so arranged, the leading gang frame will also be offset with respect to the rear or trailing frame, and in a manner that the discs of the latter frame operate in equidistantly spaced relation between or to one side of the paths of travel of the discs of the other frame. The front frame member or bar 10 of the leading gang frame and the rear frame member or bar 11 of the trailing frame are normally disposed in fixed parallel relation to the opposite ends of a pair of spaced connecting members or bars 20, which members or bars 20 are similarly and angularly bent, as at 20', medially of their oppositely disposed ends to a degree corresponding to the offset relation of the gang frames, so that the points of their attachment to the front and rear frame members or bars 10 and 11 are equidistantly spaced inwardly of the opposite ends of the latter. The members or bars 20 also have their opposite ends angularly bent in a downward direction to their points of connection with the frame members or bars 10 and 11, so that their intermediate portions are disposed above the uppermost edges of the disc blades 19. The connected end portions of the members or bars 20 are further secured to angular bracing members or brackets 21, which are commonly attached to the frame bars 10 and 11 by means of bolts or the like as shown.

With the gang frames thus connected, their adjacent front and rear frame members or bars 10 and 11 are pivotally connected together by means of a pair of arms or bars 22, which have their opposite ends pivotally connected, as at 23, to brackets or lugs 24, two of the latter being attached to the forward side of the front member or bar 10 of the rear or trailing gang frame, and the other two of the same are similarly secured to the rear side of the rear frame member or bar 11 of the front or leading gang frame. These brackets or lugs 24 are spaced apart on the opposed sides of the adjacent frame members or bars 10 and 11 in a manner that, when the latter are disposed in their normally contracted positions, the pivoted arms or bars 22 are folded into aligned relation one with respect to the other, and in parallel relation to and between the members or bars 10 and 11.

A draft bar 25 is pivotally connected at its inner end, as at 26, to a lug or bracket 27 mounted intermediately adjacent one end of the forward member or bar 10 of the leading gang frame, and extend diagonally therefrom toward the opposite end of the member or bar 10. At the forward end of the cross member or bar 15, of the leading gang frame, is the angularly bent portion of a draft lever or arm 28, which has its other and larger portion, constituting the bar 15, extending toward the rear of the gang frame on which it is mounted where it is pivoted to the rear frame member 11. The bar 15 and angular extension 28 together form a bell crank lever, one arm of which connects the bars 10 and 11 of the front frame. The free end of the lever or arm 28 is pivoted, as at 29, to the inner end of a forwardly extending draft bar 30, to the forward end of which is attached a coupling member 31. The draft members or bars 25 and 30 are each formed to provide a series of spaced apertures 25' and 30', respectively, for the adjustable connecting of the free end portion of the draft member or bar 25 to the draft member or bar 30 by the engaging of a suitable fastening, such as the bolt 32 or the like in any aligned pair of the several apertures.

As a means of adjusting the angular relation of the disks through movement of the draft members or bars 25 and 30, a rack bar 33 is pivotally attached at one end to the pivot bolt 16 at the end of the front bar 10, of the leading gang frame, opposite to that end to which the lug or bracket 27 is attached, and the same is projected in a forward direction, and into overlying relation to the draft lever or arm 28. The free end portion of the rack 33 is slidably engaged between two angle members or brackets 34, secured in properly spaced relation on the upper side of the lever or arm 28. Mounted between these angle members or brackets 34 on a pivot pin 35, extending between the same above the rack 33, is a pawl or dog 36, which cooperates with the teeth of the latter to hold the parts in adjusted position. An actuating lever 37 is secured in angular relation to the pawl or dog 36 to move the same into and out of engagement with the teeth of the rack 33, when the lever is manipulated for that purpose. A cable 38 is attached to the upper free end of the actuating lever 37, and leads to a point convenient to the operator's position on a tractor or the like (not shown), when the latter is hitched to the coupling member 31 at the forward end of the draft bar 30.

It is to be noted of the gang harrow as thus constructed and arranged, that the positions of the forward frame member or bar 10 of the leading gang frame, and the rear member or bar 11, of the trailing gang frame, always remain in the same relative position, while the remainder of both gangs are to be simultaneously offset in either direction to the right or left, and, consequently, the harrow, in its entirety, does not lengthen out, with the result that much shorter turns of the harrow are possible than would otherwise be the case.

To effect the offsetting of the gang frames, after a tractor or other draft device has been hitched to the coupling 31, the operator will exert a pull on the cable 38 and rock the lever 37 to lift the pawl or dog 36 from engagement with the rack 32, when, by backing the tractor, the movement of bell crank lever 15—28 on its pivot at 16 occurring with the angular offset travel of the draft bars 25 and 30 will act to force the inner adjacent bars of the two gang frames connected by links 22 to be shifted endwise to the offset positions desired, as for instance, to the extreme offset position as shown in Figure 2. By varying the horizontal angular disposition of the draft bars 25 and 30 and of the lever 15—28 through the adjustment afforded by rack bar 33, the angular cutting positions of the several disc blades 19 can be correspondingly varied.

Without further description, it is thought that the features and advantages of the invention will be readily apparent to those skilled in the art, and it will of course be understood that changes in the form, proportion and minor details of construction may be resorted to, without departing from the spirit of the invention or its scope as claimed.

Having thus fully described the invention, what is claimed is:

1. In a machine of the class described, a leading gang frame, a trailing gang frame, said gang frames each comprising a pair of spaced parallel frame bars and end and intermediate cross bars pivotally connecting said frame bars, disc blades journalled on the cross bars of each of said gang frames, means for retaining one of the frame bars of each of the gang frames in fixed parallel relation, and means for simultaneously shifting the other of the frame bars of said gang frames endwise to vary the angular positions of said cross bars relative to said fixed frame bars, whereby to correspondingly vary the angular cutting positions of said disc blades.

2. In a machine of the class described, a leading gang frame, a trailing gang frame, said gang frames each comprising a pair of spaced parallel frame bars and end and intermediate cross bars pivotally connecting said frame bars, disc blades journalled on the cross bars of each of said gang frames, means for retaining one of the frame bars of each of the gang frames in fixed parallel relation, means for simultaneously shifting the other of the frame bars of said gang frames endwise to vary the angular positions of said cross bars relative to said fixed frame bars, whereby to correspondingly vary the angular cutting positions of said disc blades, and means for securing said frames in any of their positions of angular adjustment.

3. In a machine of the class described, a leading gang frame, a trailing gang frame disposed in rear of said leading gang frame and in slightly offset relation with respect thereto, said gang frames each comprising a pair of spaced parallel frame bars and end and intermediate cross bars pivotally connecting said frame bars, means for retaining the front frame bar of the leading gang frame and the rear frame bar of the trailing gang frame in fixed parallel relation, disc blades carried by said cross bars, means for shifting the other of said frame bars of said gang frames endwise to vary the angular positions of said cross bars relative to said fixed frame bars, whereby to correspondingly vary the angular cutting positions of said disc blades, and means for securing said frames in any of their positions of angular adjustment.

4. In a machine of the class described, a leading gang frame, a trailing gang frame disposed in rear of said leading gang frame and in normally close spaced and slightly offset relation with respect thereto, said gang frames each comprising a pair of spaced parallel frame bars and end and intermediate cross bars pivotally connecting said frame bars, a link pivoted to the adjacent bars of the front and rear frames at laterally offset points, means for retaining the front frame bar of the leading gang frame and the rear frame bar of the trailing gang frame in fixed parallel relation, disc blades carried by said cross bars, a lever fulcrumed on one of the fixed frame bars and pivoted on one of the pivotally connected bars for shifting the other of said frame bars of said gang frames endwise to vary the angular positions of said cross bars relative to said fixed frame bars, whereby to correspondingly vary the angular cutting positions of said disc blades, and means for securing said lever in any of its positions of angular adjustment.

5. In a machine of the class described, a frame comprising front and rear bars, a plurality of spaced parallel crossbars pivotally connecting the front and rear bars, disc blades carried by the crossbars, and means for varying the angular relation of the crossbars with respect to the frame bars comprising a rigid arm extending from one of the crossbars and means for adjustably locking said arm to one of the frame bars.

6. In a machine of the class described, a frame comprising front and rear bars, a plurality of spaced parallel crossbars pivotally connecting the front and rear bars one of which crossbars is formed with a rigid horizontal angular extension at one end, a draft member connected to said extension, and an adjustable latch device connecting said extension to one of the frame bars.

7. In a machine of the class described, a frame comprising front and rear bars, a plurality of spaced parallel crossbars pivotally connecting the front and rear bars one of which crossbars is formed with a rigid horizontal angular extension at its forward end, a draft frame comprising a pair of pivotally connected diverging bars respectively pivoted to one end of the front frame bar and to the end of said angular extension, a rack-bar pivoted to the front frame bar and slidably supported by said extension, and a manually controlled latch for locking said rack-bar to the extension.

JAMES S. STEWART.